Sept. 12, 1933.  C. FISCHER  1,926,479
WHISTLE FOR COOKING VESSELS
Filed June 18, 1932
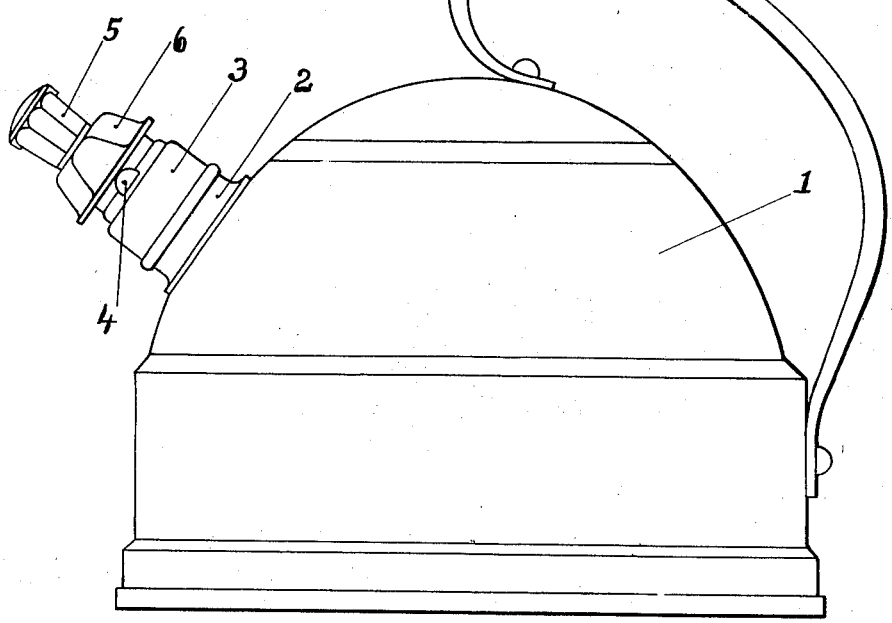
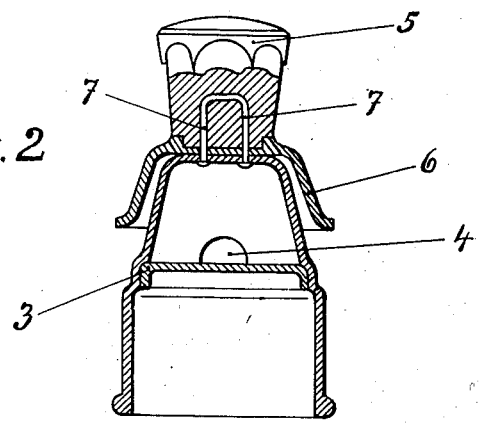
Inventor:
Carl Fischer Patented Sept. 12, 1933

1,926,479

UNITED STATES PATENT OFFICE 1,926,479

WHISTLE FOR COOKING VESSELS

Carl Fischer, Wuppertal-Barmen, Germany

Application June 18, 1932. Serial No. 617,983

2 Claims. (Cl. 116—70)

This invention relates to a whistle for cooking vessels, with a closed steam compartment, on the steam escapement aperture of which the whistle is fitted and caused to be blown by the outflowing steam. Kettles and steam-bath milk boilers may for example be fitted with such signal whistles.

The commonly used signal whistles have a handle knob above the steam outlet aperture so that they were hitherto open to the objection that steam passing out of the whistle aperture flowed directly onto the handle knob so that it could burn the fingers gripping the handle knob.

The signal whistle according to the invention has a protecting bell or plate arranged between the gripping point of the handle knob and the steam outlet aperture of the whistle and which protects the fingers gripping the handle knob from being burned by the steam and from coming in contact with the hot whistle. This protecting bell or plate may, according to the invention, be made in one piece with the handle knob or rigidly connected therewith, and the handle knob may have countersunk rivets or screws by means of which it is riveted or screwed to the dome of the whistle. The last mentioned fixation is much more durable than the method of fixation hitherto general, which consists of pressing a tooth or rib of the whistle dome into a groove in the handle knob placed therein.

An embodiment of the invention is illustrated by way of example in the accompanying drawing in which:—

Fig. 1 shows in side elevation a kettle fitted with a signal whistle improved in the manner described.

Fig. 2 is a longitudinal section through the whistle on a larger scale.

On the spout 2 of the kettle 1 a signal whistle 3 is tightly fitted so that the steam flowing out of the whistle aperture 4 causes the whistle to sound. For manipulation the whistle is provided with a handle knob 5. Between this knob and the whistle aperture 4 a protecting bell 6 is arranged which deflects the steam flowing out of the aperture 4 away from the handle knob 5 and protects the fingers against being burned by the hot whistle; this protecting bell, however, does not prevent the flowing out of the steam.

The handle knob has, in the construction illustrated, two countersunk rivets 7 with projecting ends by means of which it is tightly riveted on the dome of the whistle.

The protecting bell in the construction illustrated is separate from the handle knob and only connected to the whistle and the knob by the fixing of the knob on the whistle. The protecting bell may also be made in one piece with the knob. The handle knob might also be fixed with a single rivet, or a screw might be substituted for the rivet. The employment of two or more rivets or screws presents however the advantage that the knob cannot turn and cannot be easily wrenched off.

I claim:—

1. A whistle for cooking vessels, comprising in combination with the spout of the vessel, a sleeve-shaped body closed at one end and adapted to be slipped over said spout and having a lateral steam outlet aperture, a handle knob fixed to the closed end of said sleeve-shaped body, and a bell-shaped protecting screen inverted over the closed end of said sleeve-shaped body between said sleeve-shaped body and said handle knob and surrounding with clearance the outer side of said sleeve-shaped body from its closed end to said aperture, said screen adapted to deflect the steam passing out through the aperture in said body away from said knob.

2. A whistle as specified in claim 1, comprising in combination with the knob, the screen and the sleeve-shaped body, rivets countersunk in said knob extending through said screen into said sleeve-shaped body and clinched in the inner side of the closed end of said sleeve-shaped body.

CARL FISCHER.